United States Patent
Bae et al.

(10) Patent No.: US 11,231,898 B2
(45) Date of Patent: Jan. 25, 2022

(54) DISPLAY DEVICE AND OPERATING METHOD THEREOF

(71) Applicant: LG Electronics Inc., Seoul (KR)

(72) Inventors: Kyungnam Bae, Seoul (KR); Jeonghwan Kwon, Seoul (KR); Eunjung Lee, Seoul (KR); Jinseong Kim, Seoul (KR); Byounghyun Shin, Seoul (KR); Hyosung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/893,222

(22) Filed: Jun. 4, 2020

(65) Prior Publication Data
US 2021/0303252 A1    Sep. 30, 2021

(30) Foreign Application Priority Data

Mar. 31, 2020    (KR) .................. 10-2020-0039052

(51) Int. Cl.
*G06F 3/14*    (2006.01)
*H04N 21/41*    (2011.01)

(52) U.S. Cl.
CPC ....... *G06F 3/1454* (2013.01); *H04N 21/4126* (2013.01)

(58) Field of Classification Search
CPC .............. G06F 3/1454; H04N 21/4126; H04N 21/4104; H04N 21/41265
See application file for complete search history.

(56) References Cited

U.S. PATENT DOCUMENTS

| 2006/0268175 | A1 | 11/2006 | Choi | |
|---|---|---|---|---|
| 2013/0166769 | A1* | 6/2013 | Chang | G06F 3/1454 709/231 |
| 2013/0222210 | A1* | 8/2013 | Wang | H04N 21/4307 345/2.3 |
| 2013/0246665 | A1* | 9/2013 | Lee | G06F 3/038 710/11 |

(Continued)

FOREIGN PATENT DOCUMENTS

| EP | 1727121 | 11/2006 |
|---|---|---|
| EP | 2945393 | 11/2015 |
| WO | WO2013122564 | 8/2013 |

OTHER PUBLICATIONS docs.microsoft.com [online],"Wireless Projection Considerations and Requirements for Receiver Manufacturers I Microsoft Docs Considerations and Requirements for Reciever Manufacteres Miracast-specific features to support Wi-Fi features," Feb. 10, 2019, retrieved on Oct. 7, 2020, retrieved from the Internet URL <https://docs.microsoft.com/en-us/windows-hardware/design/device-experiences/wireless-projection-receiver-manufacturers>, 16 pages.

(Continued)

*Primary Examiner* — Ryan A Lubit
(74) *Attorney, Agent, or Firm* — Fish & Richardson P.C.

(57) ABSTRACT

Provided are a display device and an operating method thereof. The display device includes a wireless communication interface configured to receive image data from an external device, a display configured to output a screen of the external device by using the image data, and a controller configured to operate in a delay off mode or a delay on mode to minimize a delay of screen output while outputting the screen of the external device.

17 Claims, 10 Drawing Sheets

(56) References Cited

U.S. PATENT DOCUMENTS

| | | | |
|---|---|---|---|
| 2014/0009394 A1* | 1/2014 | Lee ...................... | H04N 5/2624 |
| | | | 345/157 |
| 2014/0215098 A1 | 7/2014 | Brabenac | |
| 2015/0058450 A1* | 2/2015 | Hahm ................. | H04L 65/4084 |
| | | | 709/219 |
| 2016/0088339 A1 | 3/2016 | Nakanishi | |
| 2016/0227257 A1* | 8/2016 | Frishman ........... | H04N 21/4344 |
| 2019/0306555 A1* | 10/2019 | Oh ........................ | G06F 9/3004 |

OTHER PUBLICATIONS

Extended European Search Report in European Appln. No. 20181356. 5, dated Oct. 16, 2020, 16 pages.

* cited by examiner

DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2020-0039052, filed on Mar. 31, 2020, which is hereby incorporated by reference in its entirety.

BACKGROUND

The present disclosure relates to a display device and an operating method thereof, and more particularly, to a display device for outputting a screen of an external device, and an operating method thereof.

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

Also, the display device may provide a Miracast function of outputting a screen of an external device as it is. In detail, Miracast is provided for displaying an image displayed on a small screen such as a smartphone on a large screen such as a TV. The display device may output the screen of the external device as it is by using data received from the external device.

On the other hand, there is a problem that a response delay occurs or a screen interruption occurs during the Miracast function according to the current situation of the external device, the network state, and the like.

SUMMARY

The present disclosure provides a display device, which minimize a response delay problem when outputting a screen of an external device and provide a stable viewing environment, and an operating method thereof.

The present disclosure provides a display device, which operates in a mode for providing a quick response according to a current situation when outputting a screen of an external device or a mode for minimizing an image interruption problem, and an operating method thereof.

The present disclosure provides a display device, which minimizes an image interruption problem when switching to a delay off mode or a delay on mode, and an operating method thereof.

According to the present disclosure a display device comprising: a wireless communication interface configured to receive image data from an external device; a display configured to output a screen of the external device by using the image data; and a controller configured to operate in a delay off mode or a delay on mode to minimize a delay of screen output while outputting the screen of the external device.

wherein the controller is configured to: when operating in the delay off mode, output the screen of the external device by directly using the image data received from the external device; and when operating in the delay on mode, store the image data received from the external device over a predetermined size, and output the screen of the external device by using the stored image data.

wherein the controller is configured to operate in the delay off mode or the delay on mode according to a user input.

wherein the controller is configured to operate in the delay off mode or the delay on mode according to whether a user input back channel (UIBC) is activated.

wherein the controller is configured to operate in the delay off mode when the UIBC is activated.

wherein the controller is configured to operate in the delay off mode or the delay on mode according to a bit rate of the image data received from the external device.

wherein the controller is configured to operate in the delay off mode when the bit rate is less than a preset value.

wherein the controller is configured to operate in the delay off mode or the delay on mode according to a network state.

wherein, when the display device operates in an automatic mode, the controller is configured to switch the delay off mode to the delay on mode or switch the delay on mode to the delay off mode according to a preset condition.

wherein the preset condition includes at least one of whether a user input back channel (UIBC) is activated, a bit rate of the image data received from the external device, or a network state.

wherein the controller is configured to control a screen output speed of the external device to 1× or more when switching from the delay on mode to the delay off mode.

wherein the controller is configured to control a screen output speed of the external device while switching from the delay on mode to the delay off mode so as to be faster than a screen output speed of the external device in the delay off mode.

wherein the controller is configured to switch from the delay off mode to the delay on mode at a screen interruption time point.

wherein the controller is configured to control a screen output speed of the external device while switching from the delay off mode to the delay on mode so as to be slower than a screen output speed of the external device in the delay on mode.

According to the present disclosure a method of operating a display device, the method comprising: receiving image data from an external device; outputting a screen of the external device by using the image data; and performing a control to operate in a delay off mode or a delay on mode to minimize a delay of screen output while outputting the screen of the external device.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
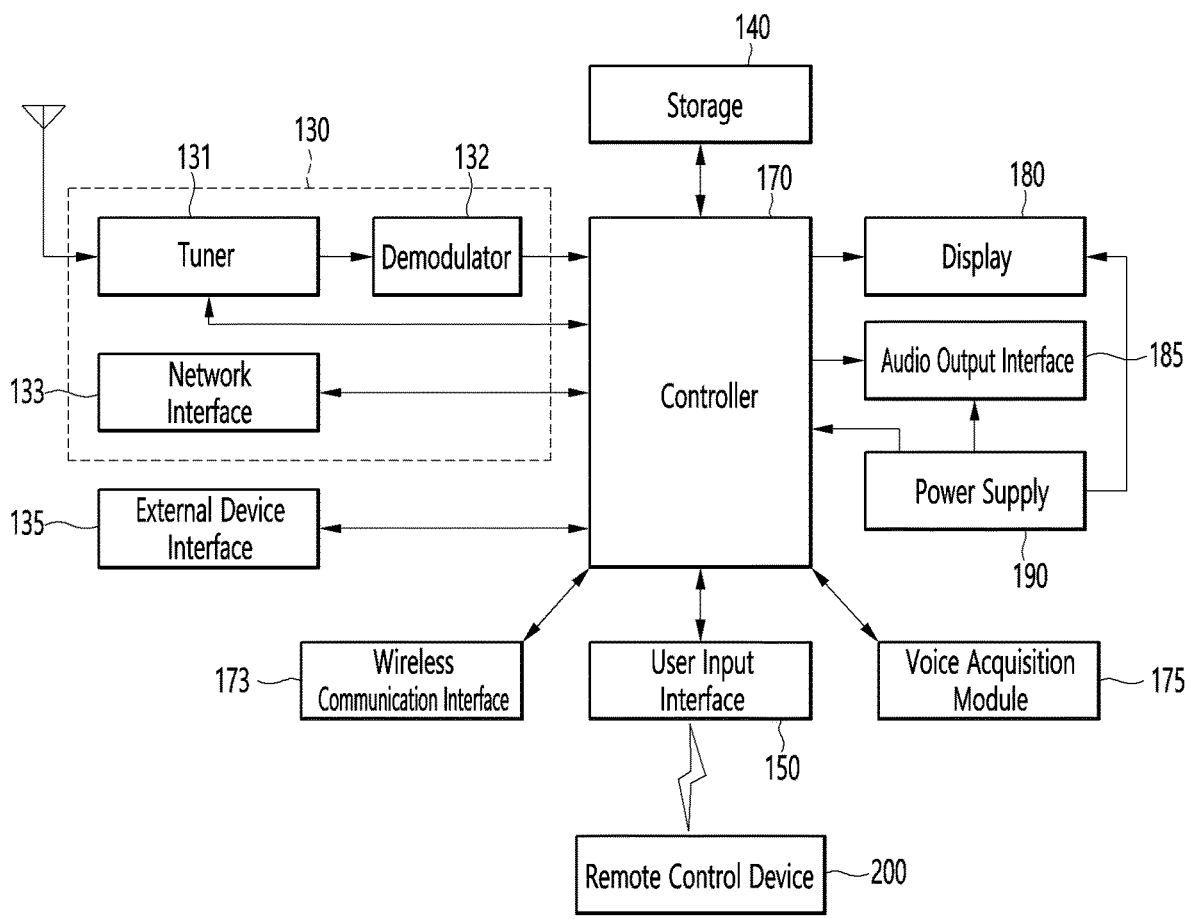
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
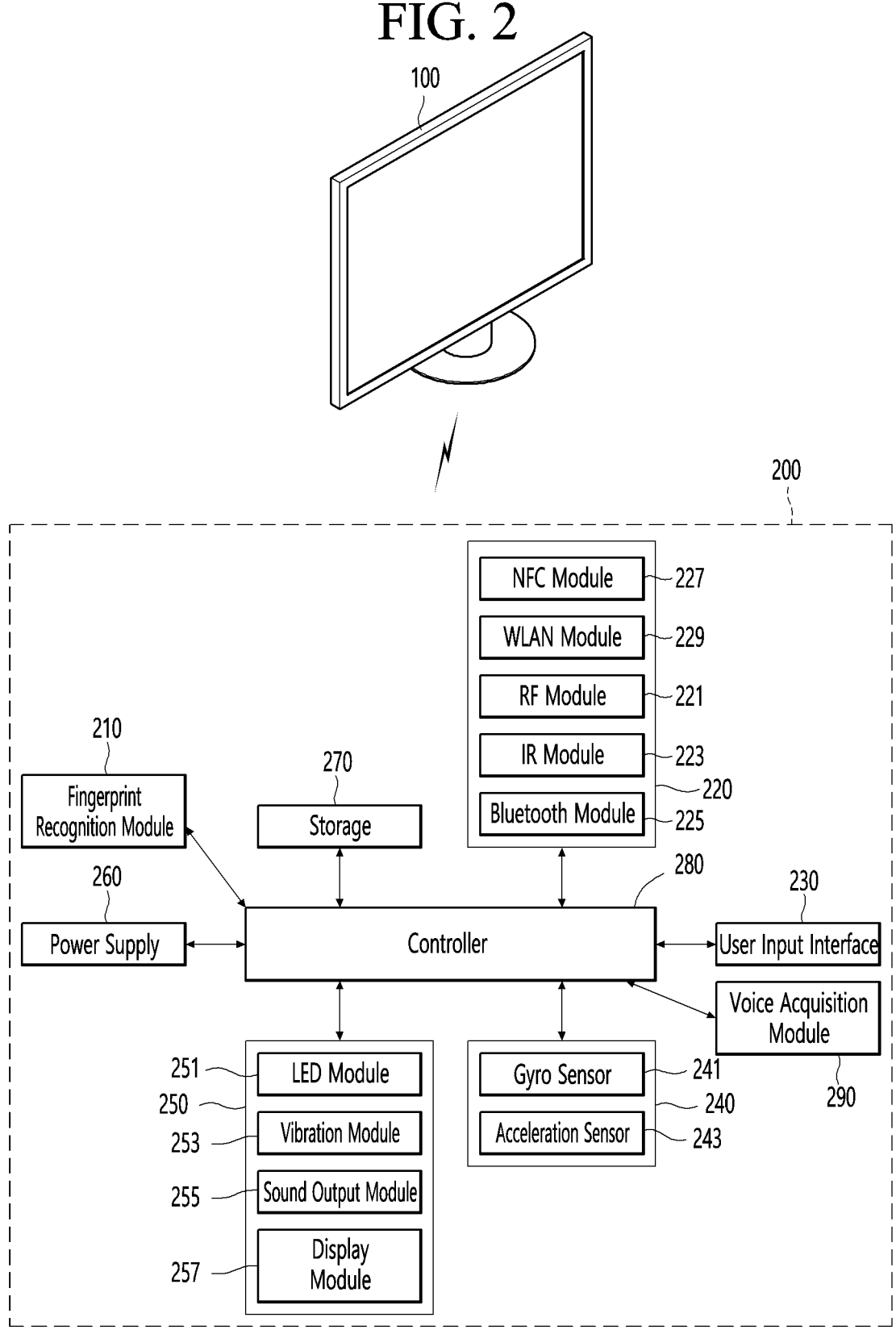
FIG. 2 is a block diagram illustrating a remote control device according to an embodiment of the present disclosure.
Figure 3:
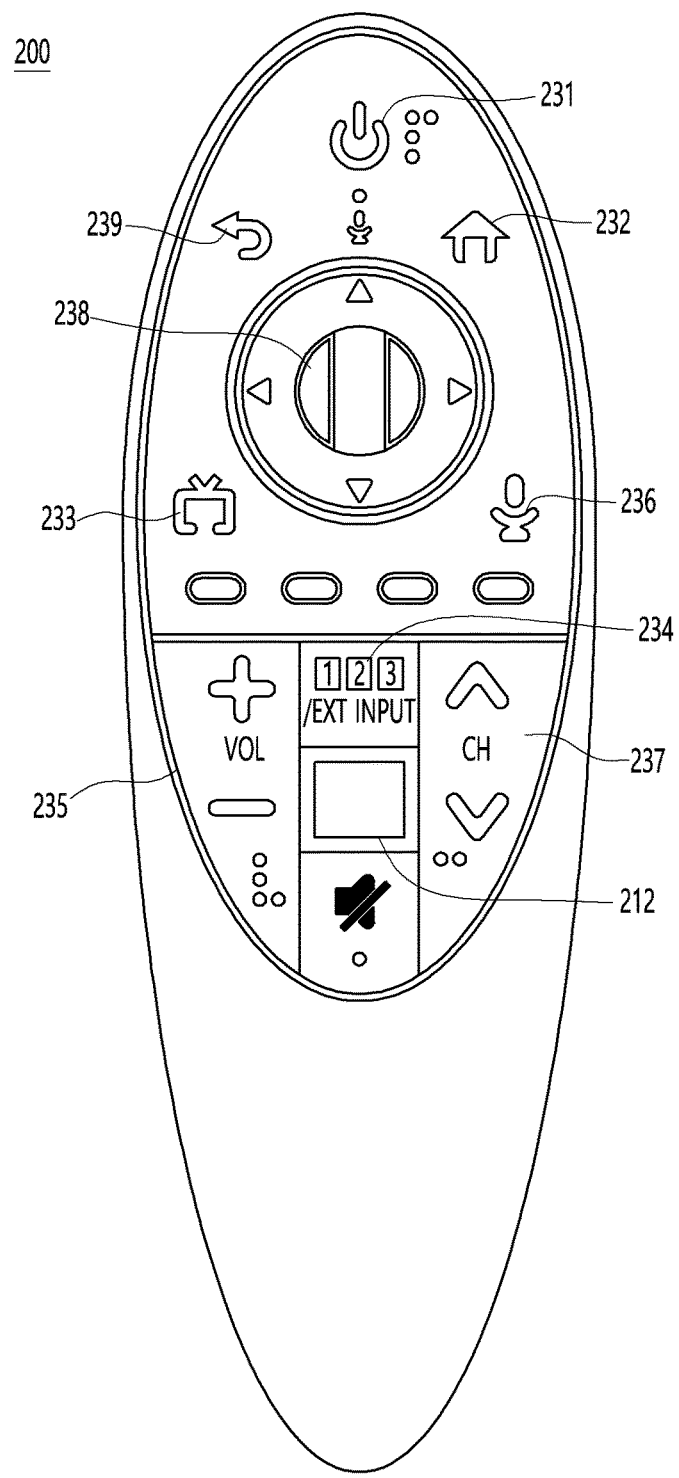
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4C:
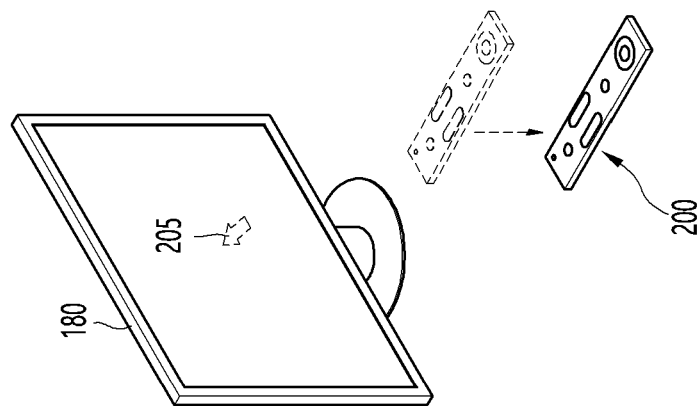
FIGS. 4A to 4C are a view of utilizing a remote control device according to an embodiment of the present disclosure.
Figure 4B:
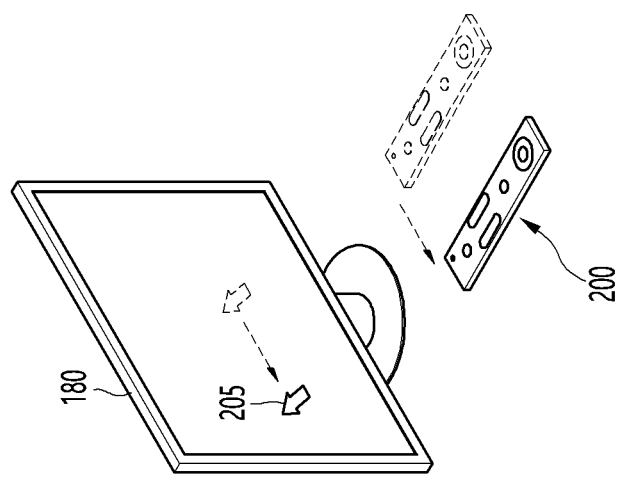
Figure 4A:
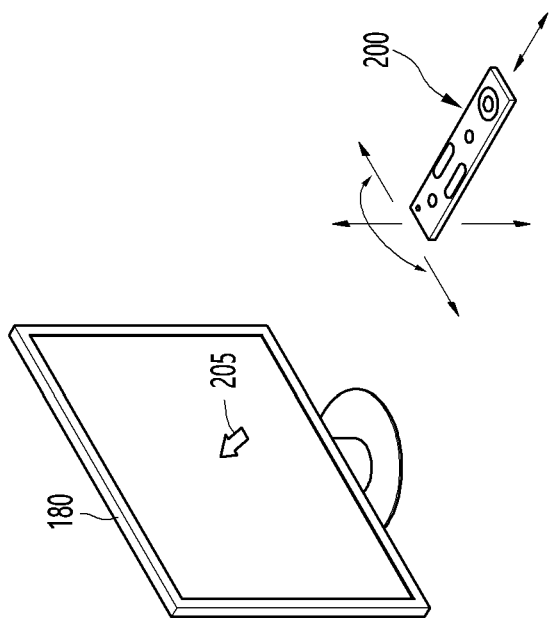

Then, FIGS. 4A to 4C are described.

FIGS. 4A to 4C are a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display 180 may display a screen of an external device connected to the display device 100. This function may be referred to as Miracast.

Next, Miracast, which is the function provided by the display device according to the embodiment of the present disclosure, will be described with reference to FIG. 5.

Figure 5:
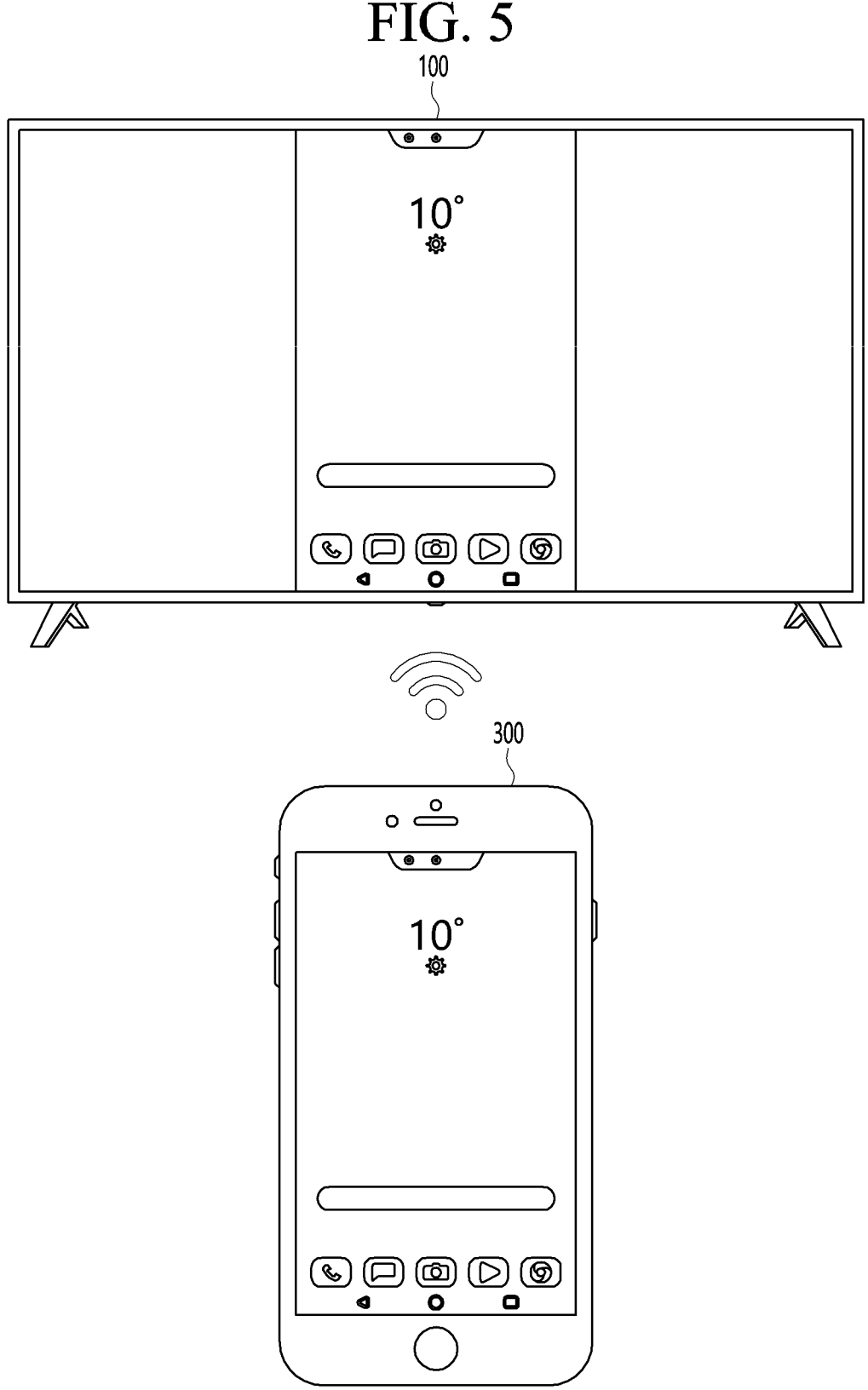
FIG. 5 is a diagram illustrating an example of a screen when the display device according to the embodiment of the present disclosure operates as Miracast.

FIG. 5 is a diagram illustrating an example of a screen when the display device according to the embodiment of the present disclosure operates as Miracast.

The display device 100 may be wirelessly connected to an external device 300 to control the display 180 to display a screen of the external device 300.

The external device 300 may include any devices that can be wirelessly connected to the display device 100. For example, the external device 300 may include a smartphone, a notebook, a tablet, and a PC. In the present specification, including FIG. 5, it is assumed that a smartphone is connected to the display device 100 as the external device 300, but this is only an example for convenience of description. Various external devices other than the smartphone may be connected to the display device 100.

The wireless communication interface 173 of the display device 100 may receive image data from the external device 300. The image data may be data about the screen of the external device 300. The image data may be data that allows the screen of the external device 300 to be output from the display device 100 as it is.

The display 180 may output the screen of the external device 300 by using the image data received from the external device 300. As illustrated in FIG. 5, the display device 100 may display the screen of the external device 300 as it is.

Also, the wireless communication interface 173 may receive, in addition to the image data, sound data from the external device 300. The audio output interface 185 may output the sound of the external device 300 by using the sound data received from the external device 300.

On the other hand, a delay may occur when the display device 100 outputs the screen of the external device 300. The delay may refer to a time difference until the same screen as the screen output from the external device 300 is output from the display device 100.

The delay may or may not occur due to network states, image data size, or the like. Various delays (time differences) may occur. However, even when the delay occurs, the user may not recognize the delay according to the situation, and even a slight delay may cause a lot of inconvenience to the user.

Therefore, Miracast may be required to minimize user inconvenience according to various situations. For example, Miracast may be required which minimizes the delay in a situation in which fast response is required, and minimizes the image interruption even when a predetermined time delay occurs in a situation in which the video or the like is played back.

The present disclosure is intended to minimize user inconvenience by providing a delay off mode and a delay on mode during the Miracast function.

On the other hand, the present disclosure is not limited to the name "Miracast". The display device 100 according to the embodiment of the present disclosure may include any devices that provide the function of outputting the screen of the external device 300 by using image data received from the external device 300.

The display device 100 according to the embodiment of the present disclosure may operate in the delay off mode or the delay on mode, which minimizes the delay of screen output while outputting the screen of the external device 300.

Figure 6A:
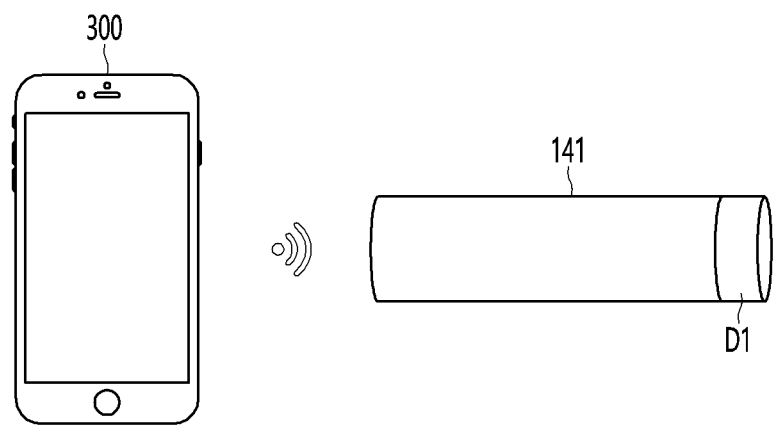
FIGS. 6A and 6B are a diagram for describing a delay off mode and a delay on mode according to an embodiment of the present disclosure.
Figure 6B:
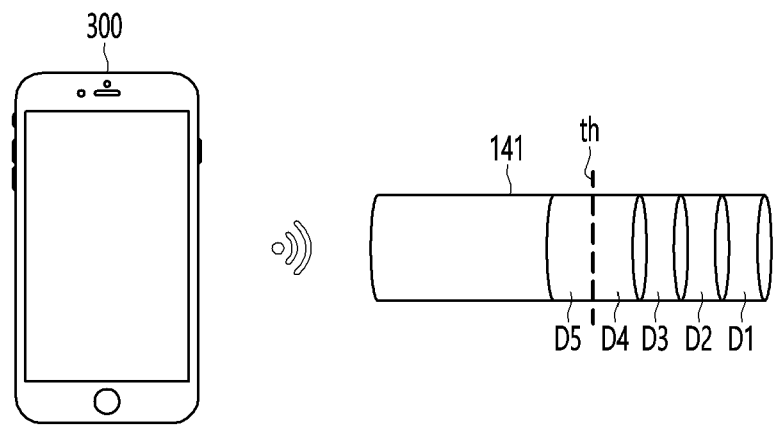

FIGS. 6A and 6B are a diagram for describing a delay off mode and a delay on mode according to an embodiment of the present disclosure.

In detail, FIG. 6A may indicate the delay off mode, and FIG. 6B may indicate the delay on mode.

The delay off mode may be a mode in which the screen of the external device 300 is output by directly using the image data received from the external device 300.

The delay on mode may be a mode in which the image data received from the external device 300 is stored with at least a predetermined size and the screen of the external device 300 is output by using the stored image data.

In detail, a buffer 141 may be provided in the storage 140. The buffer 141 may temporarily store the image data received from the external device 300. The image data stored in the buffer 141 may be deleted after being used for screen output.

When operating in the delay off mode, the controller 170 may control the display 180 to output the screen of the external device 300 by directly using the image data received from the external device 300. For example, as illustrated in FIG. 6A, when first data D1 is received as the image data, the controller 170 may directly output the image by using the received first data D1. In this case, the delay may be minimized because the image according to the received image data is output as soon as the image data is received.

When operating in the delay on mode, the controller 170 may store the image data received from the external device 300 with at least a predetermined size and control the display 180 to output the screen of the external device 300 by using the stored image data. For example, as illustrated in FIG. 6B, the controller 170 may output the image by using the stored image data only when the size of the image data stored in the buffer 141 is greater than or equal to a predetermined size (th). When first to fourth data D1, D2, D3, and D4 are stored in the buffer 141 as the image data, the controller 170 may output the image by using the first to fourth data D1, D2, D3, and D4 because the size of the image data stored in the buffer 141 is greater than or equal to the predetermined size (th). Since the size of the image data stored in the buffer 141 is less than the predetermined size (th) until the fourth data D4 is received, the controller 170 does not output the image and waits until the image data stored in the buffer 141 becomes greater than the predetermined size (th). The controller 170 may continue to receive image data while displaying or waiting for the image. Referring to the example of FIGS. 6A and 6B, the controller 170 may receive image data, such as fifth data D5, while outputting the image through the first to fourth data D1, D2, D3, and D4. In this case, since the image according to the image data is output only when the image data is received over a predetermined size, a delay may occur until the image data over the predetermined size is stored. However, since the image is output by the image data stored over the predetermined size, the image interruption may be minimized.

Figure 7:
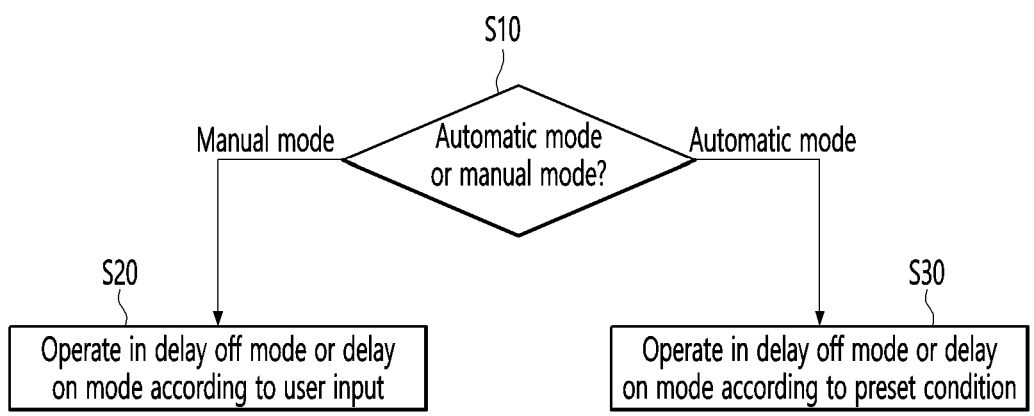
FIG. 7 is a flowchart illustrating an operating method of a display device according to an embodiment of the present disclosure.

FIG. 7 is a flowchart illustrating an operating method of a display device according to an embodiment of the present disclosure. In particular, FIG. 7 is a flowchart illustrating an operating method in which the display device 100 outputs the screen of the external device 300.

The controller 170 may determine whether a mode is an automatic mode or a manual mode (S10).

The automatic mode may be a mode controlled to operate in one of a delay off mode and a delay on mode according to a preset condition. The automatic mode may be a mode controlled by the delay off mode or the delay on mode according to the preset condition, regardless of a user input.

The manual mode may be a mode controlled to operate in one of a delay off mode and a delay on mode according to a user input. The manual mode may be determined as the delay off mode or the delay on mode only by the user input, regardless of a preset condition.

Figure 8:
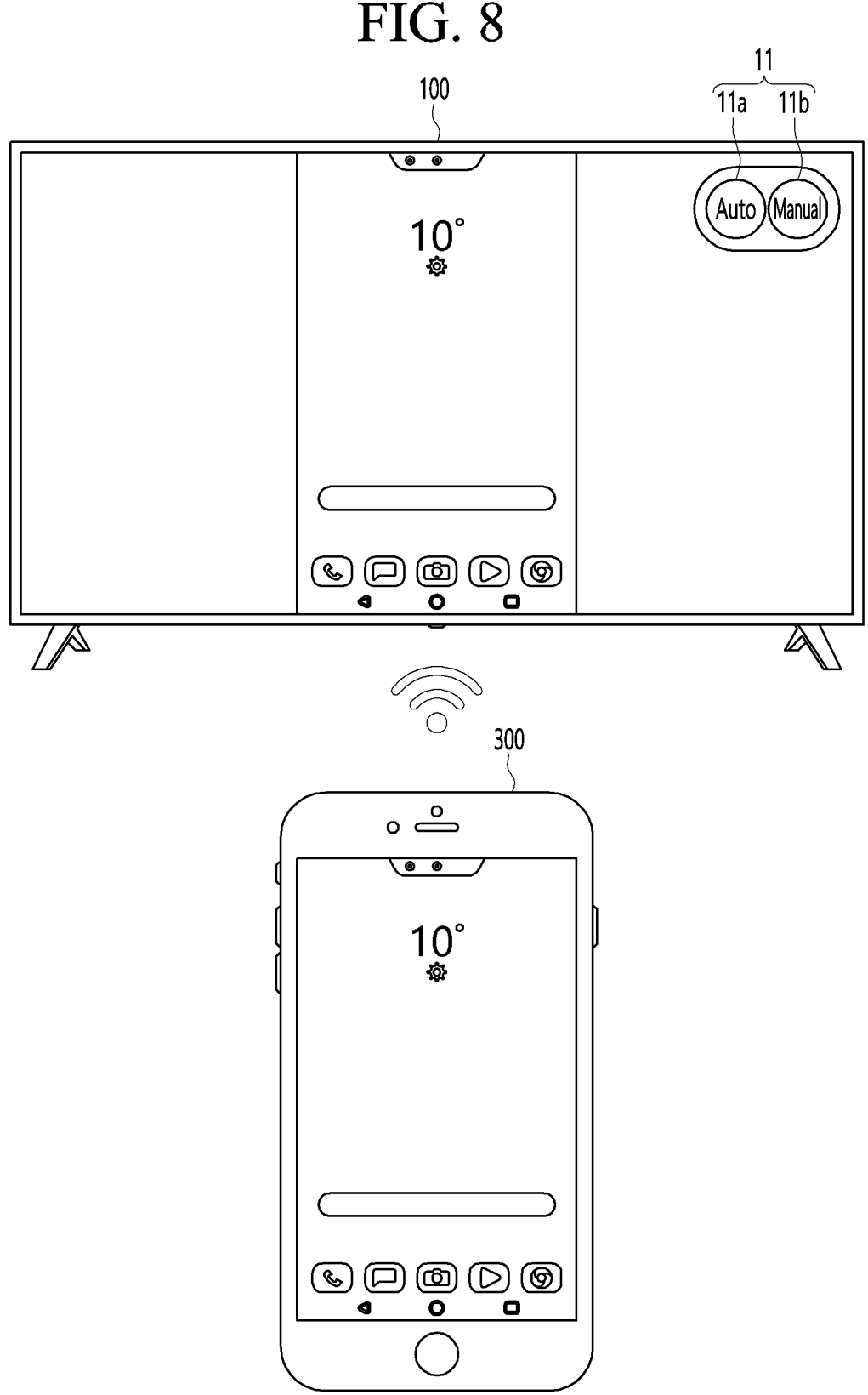
FIG. 8 is a diagram illustrating an example of a screen displayed so that the display device according to the embodiment of the present disclosure receives the automatic mode or the manual mode.

FIG. 8 is a diagram illustrating an example of a screen displayed so that the display device according to the embodiment of the present disclosure receives the automatic mode or the manual mode.

The display 180 of the display device 100 may display an automatic/manual mode icon 11 while outputting the screen of the external device 300. The user may select the automatic mode or the manual mode through the automatic/manual mode icon 11.

When a command for selecting the automatic mode icon 11a is received through a pointer 205, the controller 170 may operate in the automatic mode. When operating in the automatic mode, the controller 170 may switch the delay off mode to the delay on mode or switch the delay on mode to the delay off mode according to a preset condition.

When a command for selecting the manual mode icon 11b is received through the pointer 205, the controller 170 may operate in the manual mode. When operating in the manual mode, the controller 170 may operate in the delay off mode or the delay on mode according to a user input.

FIG. 7 is described again.

As a result of determining whether the mode is the automatic mode or the manual mode, when the mode is determined as the manual mode, the controller 170 may operate in the delay off mode or the delay on mode according to the user input (S20).

The controller 170 may receive the user input of operating in the delay off mode or the delay on mode.

Next, a method of receiving a user input of allowing the display device 100 to operate in the delay off mode or the delay on mode will be described with reference to FIG. 9.

Figure 9:
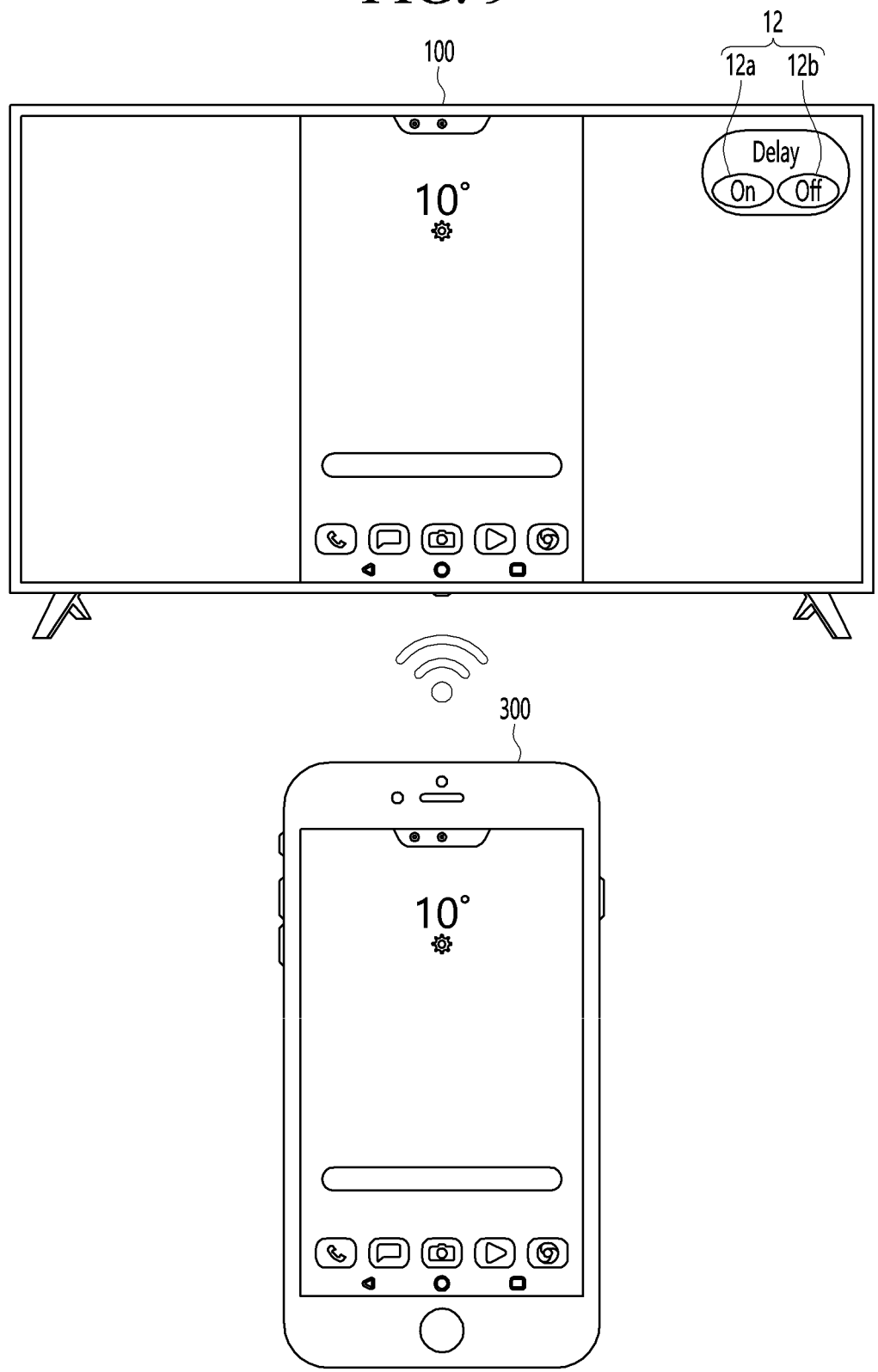
FIG. 9 is a diagram illustrating an example of the screen displayed when the display device according to the embodiment of the present disclosure operates in the manual mode.

FIG. 9 is a diagram illustrating an example of the screen displayed when the display device according to the embodiment of the present disclosure operates in the manual mode.

When operating in the manual mode, the display 180 of the display device 100 may display the screen as illustrated in FIG. 9. The display 180 of the display device 100 may display a delay on/off mode icon 12 while operating in the manual mode. The user may select the delay on mode or the delay off mode through the delay on/off mode icon 12.

When a command for selecting the delay on mode icon 12a is received through the pointer 205, the controller 170 may operate in the delay on mode. When a command for selecting the delay off mode icon 12b is received through the pointer 205, the controller 170 may operate in the delay off mode.

As illustrated in FIG. 9, the controller 170 may receive the user input of operating in the delay off mode or the delay on mode through the screen. However, this is only an example, and the controller 170 may receive the user input of operating in the delay off mode or the delay on mode in the manual mode in various ways.

FIG. 7 is described again.

As a result of determining whether the mode is the automatic mode or the manual mode, when the mode is determined as the automatic mode, the controller 170 may operate in the delay off mode or the delay on mode according to a preset condition (S30).

The preset condition may be set as a default. For example, the preset condition may include at least one of whether a user input back channel (UIBC) is activated, whether the external device 300 is outputting a video, a bit rate of image data received from the external device 300, or a network state. However, this is only an example and the present disclosure is not limited thereto.

Figure 10:
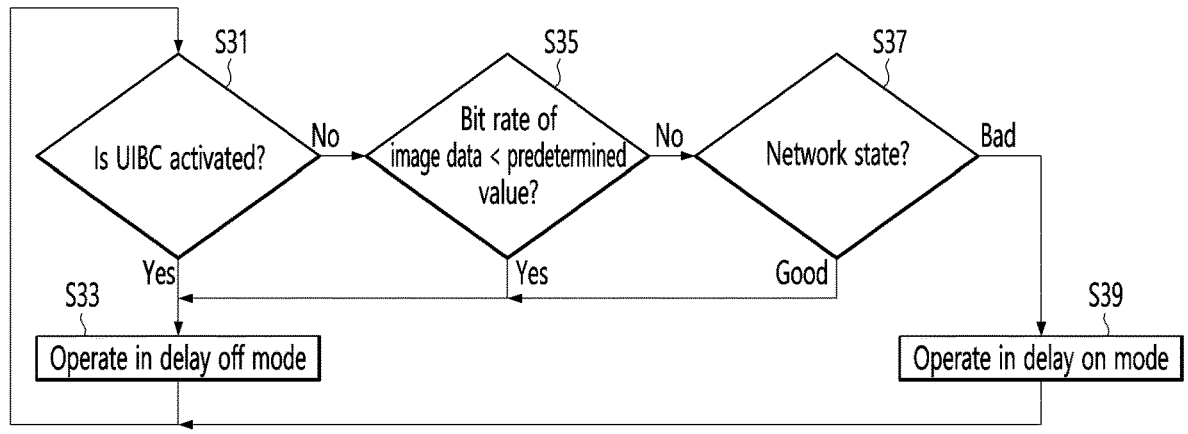
FIG. 10 is a flowchart illustrating a method in which the display device according to the embodiment of the present disclosure operates in the automatic mode.

FIG. 10 is a flowchart illustrating a method in which the display device according to the embodiment of the present disclosure operates in the automatic mode. FIG. 10 may be a flowchart in which operation S30 of FIG. 7 is embodied.

The controller 170 may operate in the delay off mode or the delay on mode according to whether the UIBC is activated.

The controller 170 may determine whether the UIBC is activated (S31).

The UIBC may refer to a function of controlling the external device 300 connected to the display device 100 through the pointer 205 or the like.

As a specific example, the display device 100 may recognize motion packet data received from the remote control device 200 as a trigger for activating the UIBC. Accordingly, the controller 170 of the display device 100 may activate the UIBC when the motion packet data is received from the remote control device 200.

The controller 170 may transmit or receive a message to or from the external device 300 so as to activate the UIBC and may allocate a bandwidth for the UIBC therethrough. Even when the bandwidth is separately allocated, the activation of the UIBC is recognized as a case where the user intends to control the external device 300 through the pointer 205. Therefore, the minimization of the delay generation may be prioritized over data loss.

Accordingly, when the UIBC is activated, the controller 170 may operate in the delay off mode (S33).

When the UIBC is activated, the controller 170 may control the display 180 to display the pointer 205.

Accordingly, according to an embodiment, the controller 170 may operate in the delay off mode when the pointer 205 is displayed on the display 180.

In addition, according to another embodiment, the controller 170 may operate in the delay off mode when the pointer 205 is moving.

The controller 170 may compare the bit rate of the image data received from the external device 300 with a preset value, and the controller 170 may operate in the delay off mode or the delay on mode according to the bit rate of the image data received from the external device 300.

That is, when the UIBC is not activated, the controller 170 may determine whether the bit rate of the image data received from the external device 300 is less than the preset value (S35).

In this case, the preset value may be changed according to the specifications of the display device 100.

When the bit rate of the image data received from the external device 300 is less than the preset value, the controller 170 may operate in the delay off mode (S33).

When the bit rate of the image data is less than the preset value, user inconvenience may be relatively small even when video interruption occurs. Therefore, when the bit rate is less than the preset value, the controller 170 operates in the delay off mode, thereby minimizing user inconvenience and minimizing the occurrence of delay when outputting the screen of the external device 300.

Similarly, although not illustrated in FIG. 10, the controller 170 may operate in the delay off mode or the delay on mode according to whether the external device 300 is playing back the video. The controller 170 may operate in the delay off mode when the external device 300 is playing back the video and may operate in the delay on mode when the external device 300 is playing back the video.

The controller 170 may operate in the delay off mode or the delay on mode according to the network state.

When the bit rate of the image data is greater than or equal to the preset value, the controller 170 may determine the network state (S37).

The network state may refer to a state of wireless communication in which the display device 100 and the external device 300 are connected to each other.

The controller 170 may determine the network state by using a ping (Packet Internet Groper) or RSSI (Received Signal Strength Indicator). For example, when the ping is less than a preset time or the RSSI is greater than or equal to a preset strength, the controller 170 may determine that the network state is good, and when the ping is less than the preset time or the RSSI is less than the preset strength, the controller 170 may determine that the network state is bad. However, this is only an example, and the present disclosure is not limited thereto.

When the network state is good, the controller 170 may operate in the delay off mode (S33).

When the network state is good, the controller 170 may operate in the delay off mode to minimize the occurrence of delay when outputting the screen of the external device 300.

On the other hand, when the network state is bad, the controller 170 may operate in the delay on mode (S39).

That is, the controller 170 may operate in the delay on mode when the UIBC is deactivated, the bit rate of image data is greater than or equal to the preset value, and the network state is bad.

Accordingly, even when the network state is not good, the controller 170 may output the screen of the external device 300 without interruption, particularly the video, through buffering of image data. That is, the controller 170 has difficulty in updating the screen of the external device 300 in real time, but the controller 170 may minimize the interruption of a user's image viewing by outputting the image without interruption in a situation in which real-time updating is unnecessary (for example, when the external device 300 is playing back the video).

On the other hand, since the order of operations S31, S35, and S37 in FIG. 10 is only an example, the order of the respective operations may be changed. In addition, some of operations S31, S35, and S37 of FIG. 10 may be omitted, or other operations may be further added.

The controller 170 may determine whether the condition continues to correspond to the preset condition even when operating in the delay off mode or operating in the delay on mode. The controller 170 may switch from the delay off mode to the delay on mode or switch from the delay off mode to the delay off mode according to whether the condition corresponds to the preset condition.

On the other hand, when switching from the delay on mode to the delay off mode or switching from the delay off mode to the delay on mode, the image interruption problem may occur. Accordingly, the display device 100 according to the embodiment of the present disclosure may minimize the image interruption problem by using the image interruption time point or adjusting the image playback speed when switching from the delay on mode to the delay off mode or switching from the delay off mode to the delay on mode.

Figure 11:
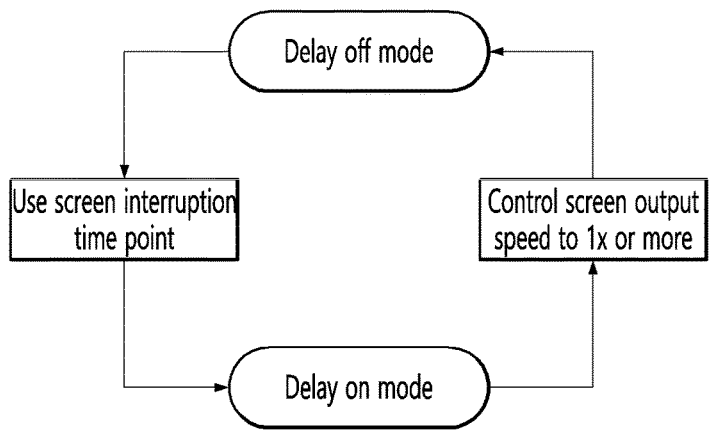
FIG. 11 is a diagram illustrating an operation method when the display device according to the embodiment of the present disclosure switches between the delay on mode and the delay off mode.

FIG. 11 is a diagram illustrating an operation method when the display device according to the embodiment of the present disclosure switches between the delay on mode and the delay off mode.

When the display device 100 switches from the delay on mode to the delay off mode, the image data stored in the buffer 141 may need to be quickly consumed. As a specific example, since the first size of the image data stored in the buffer 141 in the delay on mode is larger than the second size of the image data stored in the buffer 141 in the delay off mode, part of the image data stored in the buffer 141 may have to be discarded when switching from the delay on mode to the delay off mode. In this case, when the corresponding image data is discarded, image interruption may be caused.

Accordingly, the controller 170 may control the screen output speed of the external device 300 to 1× or more when switching from the delay on mode to the delay off mode. That is, the controller 170 may control the screen output speed of the external device 300 (for example, a first playback speed) while switching from the delay on mode to the delay off mode so as to be faster than the screen output speed of the external device 300 (for example, a second playback speed) in the delay off mode.

In detail, when switching from the delay on mode to the delay off mode, the controller 170 may minimize the image interruption problem by quickly playing the image according to image data corresponding to a difference between the first size and the second size. In this case, even when the image playback speed is fast, the playback speed is recovered again within a short time, and thus, it is difficult for the user to recognize the change in the playback speed, thereby minimizing user inconvenience.

On the other hand, when switching from the delay off mode to the delay on mode, the image is not output until the image data of a predetermined size or more is stored in the buffer 141. Thus, the image output is temporarily stopped. In order to solve this problem, according to an embodiment, the controller 170 may switch to the delay on mode by using the screen interruption time point. That is, when the controller 170 determines to switch from the delay off mode to the delay on mode, the controller 170 may operate to switch from the delay off mode to the delay on mode at the screen interruption time point.

According to another embodiment, the controller 170 may control the screen output speed of the external device 300 (for example, a third playback speed) while switching from the delay off mode to the delay on mode so as to be slower than the screen output speed of the external device 300 (for example, a fourth playback speed) in the delay on mode. Therefore, when switching from the delay off mode to the delay on mode, the problem that the image output is temporarily stopped can be improved.

In summary, the second playback speed and the fourth playback speed may be normal playback speeds, for example, 1× speed. The first playback speed may be faster than the second and fourth playback speeds, and the third playback speed may be slower than the second and fourth playback speeds.

According to the present disclosure, since the display device operates in the delay off mode or the delay on mode while outputting the screen of the external device, the response delay is minimized or the screen interruption problem is minimized.

According to the present disclosure, since the display device operates in the delay off mode or the delay on mode according to the state of the display device, the state of the external device, or the state of the network, the usability and convenience of Miracast are improved.

According to the present disclosure, when the display device is switched to the delay off mode or the delay on mode, the occurrence of the image interruption problem is minimized by adjusting the image playback speed or using the image interruption time point.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

Each of the embodiments disclosed in this specification may be implemented alone, or in combination with other embodiments.

The scope of protection of the present disclosure should be interpreted by the appending claims, and all technical ideas within the scope of equivalents should be construed as falling within the scope of the present disclosure.

What is claimed is:

1. A display device comprising:
    a wireless communication interface configured to receive image data from an external device;
    a display configured to output a screen of the external device by using the image data; and
    a controller configured to while outputting the screen of the external device, operate in a delay on mode or a delay off mode that minimizes a delay of screen output,
    wherein the controller is further configured to control a screen output speed of the external device, while switching from the delay off mode to the delay on mode, to be slower than a screen output speed of the external device in the delay on mode,
    wherein the controller is further configured to operate in the delay off mode or the delay on mode according to whether a user input back channel (UIBC) is activated, the UIBC being able to control the external device through a pointer.

2. The display device of claim 1, wherein the controller is configured to:
    based on operating in the delay off mode, output the screen of the external device by directly using the image data received from the external device; and
    based on operating in the delay on mode, store the image data received from the external device over a predetermined size, and output the screen of the external device by using the stored image data.

3. The display device of claim 1, wherein the controller is configured to operate in the delay off mode or the delay on mode according to a user input.

4. The display device of claim 1, wherein the controller is configured to operate in the delay off mode based on the UIBC being activated.

5. The display device of claim 1, wherein the controller is configured to operate in the delay off mode or the delay on mode according to a bit rate of the image data received from the external device.

6. The display device of claim 5, wherein the controller is configured to operate in the delay off mode based on the bit rate being less than a preset value.

7. The display device of claim 1, wherein the controller is configured to operate in the delay off mode or the delay on mode according to a network state.

8. The display device of claim 1, wherein, based on the display device operating in an automatic mode, the controller is configured to switch the delay off mode to the delay on mode or switch the delay on mode to the delay off mode according to a preset condition.

9. The display device of claim 8, wherein the preset condition includes at least one of whether the UIBC is activated, a bit rate of the image data received from the external device, or a network state.

10. The display device of claim 8, wherein the controller is configured to control a screen output speed of the external device to 1× or more when switching from the delay on mode to the delay off mode.

11. The display device of claim 8, wherein the controller is configured to control the screen output speed of the external device, while switching from the delay on mode to the delay off mode, so as to be faster than the screen output speed of the external device in the delay off mode.

12. The display device of claim 8, wherein the controller is configured to switch from the delay off mode to the delay on mode at a screen interruption time point.

13. A method of operating a display device, the method comprising:
receiving image data from an external device;
outputting a screen of the external device by using the image data; and
performing a control to operate, while outputting the screen of the external device, in a delay off mode that minimizes a delay of screen output or a delay on mode,
wherein the method further comprises:
controlling a screen output speed of the external device, while switching from the delay off mode to the delay on mode, to be slower than a screen output speed of the external device in the delay on mode, and
operating the delay off mode or the delay on mode according to whether a user input back channel (UIBC) is activated, the UIBC being able to control the external device through a pointer.

14. The method of claim 13, wherein the method further comprises:
based on operating in the delay off mode, outputting the screen of the external device by directly using the image data received from the external device; and
based on operating in the delay on mode, storing the image data received from the external device over a predetermined size, and output the screen of the external device by using the stored image data.

15. The method of claim 13, wherein the delay off mode or the delay on mode is operated according to a user input.

16. The method of claim 13, wherein the delay off mode is operated based on the UIBC being activated.

17. The method of claim 13, wherein the delay off mode or the delay on mode is operated according to a bit rate of the image data received from the external device.

* * * * *